March 22, 1960 — C W. MUSSER — 2,929,265
STRAIN WAVE GEARING – MULTIPLE TOOTH DIFFERENCES
Original Filed March 21, 1955 — 2 Sheets-Sheet 1
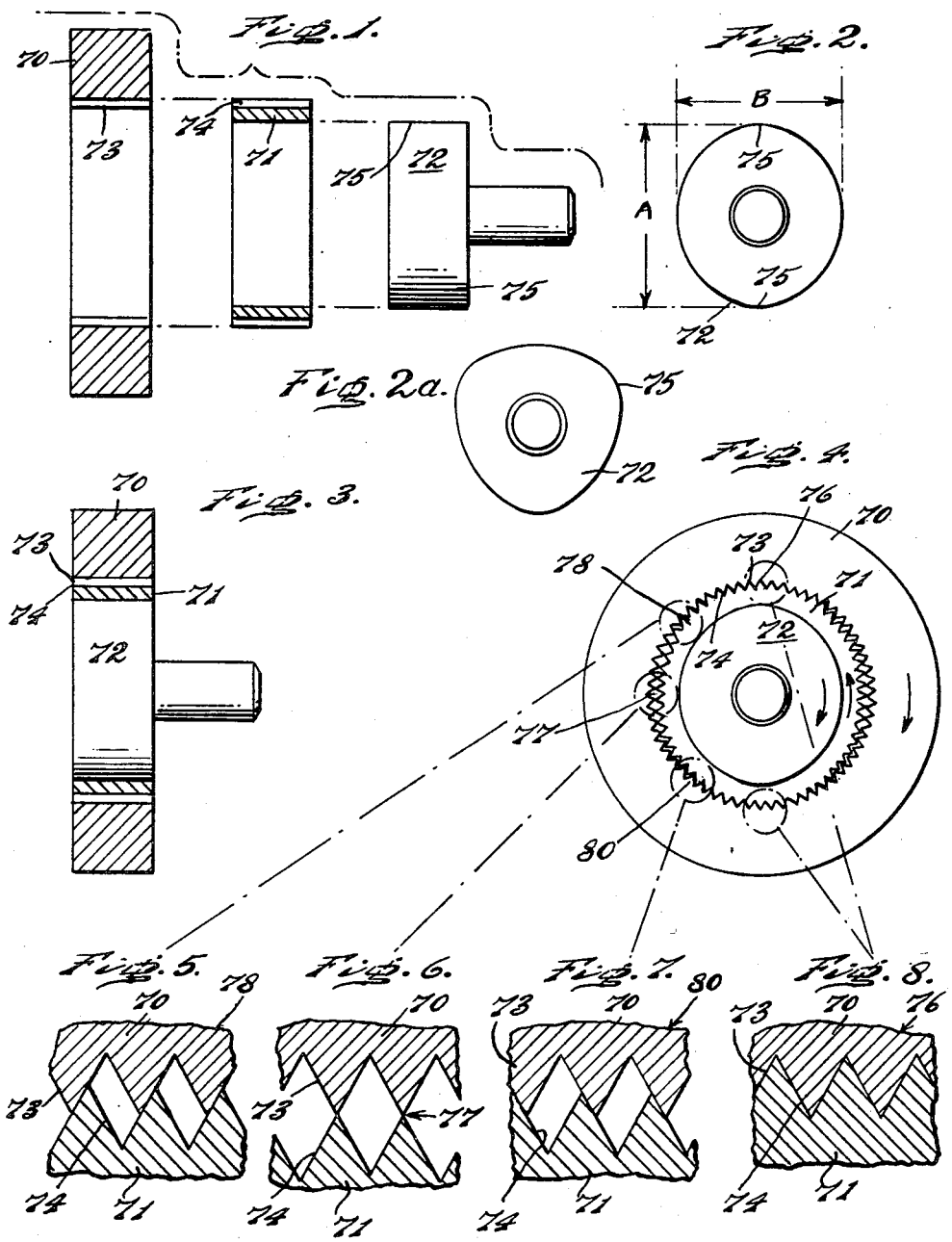
INVENTOR.
C. Walton Musser
BY
ATTORNEYS.

March 22, 1960     C W. MUSSER     2,929,265
STRAIN WAVE GEARING – MULTIPLE TOOTH DIFFERENCES
Original Filed March 21, 1955     2 Sheets-Sheet 2
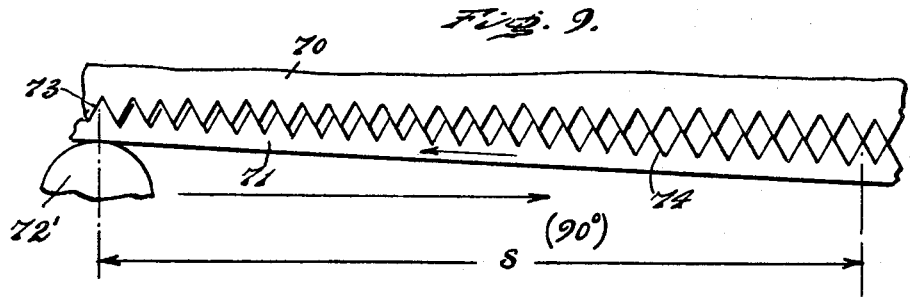
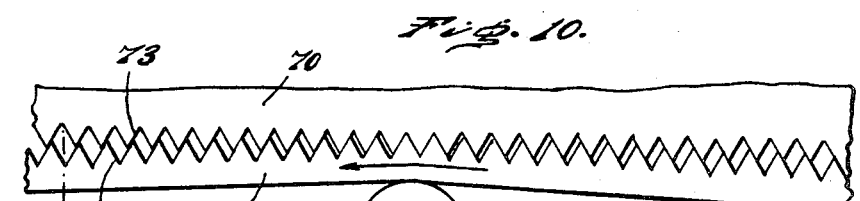
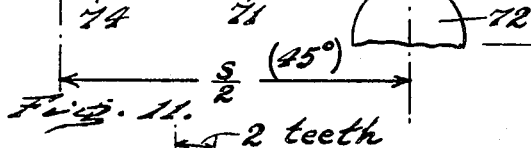
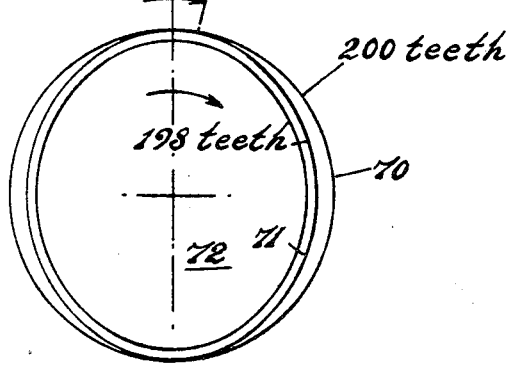
Gear ratio
2 in 200
100 to 1
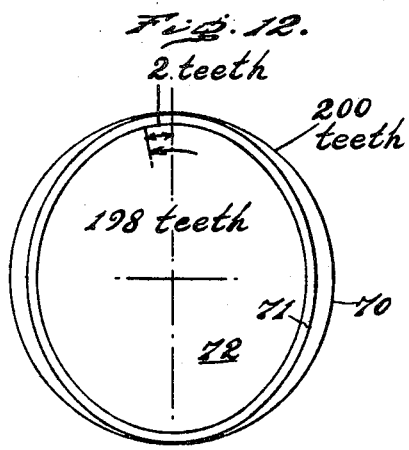
Gear ratio
2 in 198
99 to 1
INVENTOR.
C. Walton Musser
BY
ATTORNEYS.

United States Patent Office 2,929,265
Patented Mar. 22, 1960

2,929,265

STRAIN WAVE GEARING—MULTIPLE TOOTH DIFFERENCES

C Walton Musser, Beverly, Mass., assignor to United Shoe Machinery Corporation, Boston, Mass., a corporation of New Jersey Original application March 21, 1955, Serial No. 495,479, now Patent No. 2,906,143, dated September 29, 1959. Divided and this application March 23, 1959, Serial No. 801,192

3 Claims. (Cl. 74—640)

The present invention relates to motion transmitting mechanism, and particularly to gearing in which relative motion occurs between an internal gear and a cooperating external gear.

The present application relates to a species of my parent application Serial No. 495,479, filed March 21, 1955, for Strain Wave Gearing, now U.S. Patent No. 2,906,143, granted September 29, 1959; incorporated herein by reference, which species is directed to a difference in number of teeth constituting a multiple of the number of lobes in the strain-inducer. The reader is referred to my patent aforesaid for a discussion of the basic principles and theory relating to the subject matter.

The species of the parent application relating to the dual form and to the electromagnetic strain-inducer is embodied in my copending application Serial No. 656,572, filed May 2, 1957, for Dual Strain Wave Gearing.

A purpose of the invention is to secure relative motion between cooperating internal and external gears, by propagating a strain wave which advances an area of contact or preferably a plurality of areas of contact between the respective gears.

A further purpose is to employ a difference in the number of teeth of the cooperating gears which is a multiplicity of the number of lobes on the strain-inducing element.

A further purpose is to maintain a large percentage of the teeth of two cooperating gears in contact at any one time, preferably more than 50% of each.

A further purpose is to secure low pitch line velocity in gearing systems.

A further purpose is to avoid concentration of wear on individual teeth, and particularly to distribute the wear uniformly over all the teeth in a gearing system.

A further purpose is to operate gearing with very small tooth motion.

A further purpose is to operate gearing with a very low tooth sliding velocity.

A further purpose is to balance the forces in gearing, and thereby reduce or eliminate any lateral components external to the system.

A further purpose is to develop the power in a gearing system at the point of greatest leverage.

A further purpose is to obtain a large angle of action in gearing.

A further purpose is to secure surface contact rather than point contact or line contact, between teeth of cooperating gears, and desirably also to maintain a relatively large surface of contact for a succession of tooth positions.

A further purpose is to bring gear teeth into mesh by surface sliding in one direction only.

A further purpose is to operate gearing with sinusoidal tooth motion.

A further purpose is to secure a wide variety of available gear reductions by variations in gearing of the same design, and especially to obtain very large gear reductions.

A further purpose is to obtain gear ratios in the range between 10 to 1 and 1 million to 1 from a gearing system.

A further purpose is to obtain a very wide and preferably unlimited ratio selection.

A further purpose is to produce a gearing system with large torque capabilities.

A further purpose is to secure relatively low tooth contact pressures, and thereby minimize the tendency to excessive load concentrations on certain portions of the teeth.

A further purpose is to largely avoid varying loads by virtue of force components produced from gear action.

A further purpose is to operate the gearing with low shear stresses throughout.

A further purpose is to secure a high efficiency on high gear ratios.

A further purpose is to obtain torsional rigidity of the output of a gear train or system.

A further purpose is to secure a gearing system with a high degree of adaptability, and very few parts.

A further purpose is to obtain ease of lubrication in gearing.

A further purpose is to manufacture gearing of very small size, and correspondingly light weight.

A further purpose is to produce gearing by simple manufacturing methods.

A further purpose is to obtain quiet operation of gearing.

A further purpose is to provide a coaxial relationship between input and output in a gearing system.

A further purpose is to avoid difficulty from problems relating to center distance.

A further purpose is to produce a gearing system which is insensitive to misalignment between input and output.

A further purpose is to obtain differential motion which is insensitive to eccentricity and to tooth shape.

A further purpose is to distribute the input stresses at a different location from the output stresses in a gearing system.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is an exploded axial section of a device for transmitting motion according to the present invention, in a simplified form.

Figure 2 is a right end elevation of the strain inducer shown in Figure 1.

Figure 2a is a view similar to Figure 2 showing a modification in which the strain inducer has three lobes rather than two.

Figure 3 is an axial section corresponding generally to the exploded section of Figure 1, but showing the parts assembled in their normal operating relationship.

Figure 4 is a right end elevation of the assembly of Figure 3.

Figures 5 to 8 inclusive are enlarged developed fragmentary sections transverse to the axis showing the relative relations of the teeth at various positions in Figure 4, as indicated by the corresponding section lines.

Figures 9 and 10 are enlarged developed fragmentary elevations of the relative relationships of the ring gear and strain gear at different positions of the strain inducer. These views likewise correspond with positions of rack elements which may be employed according to the invention.

Figure 11 is a diagrammatic end elevation showing the mating position where the ring gear is driven and the strain gear is stationary.

Figure 12 is a view corresponding to Figure 11, but drawn for the condition in which the ring gear is stationary and the strain gear is driven.

Describing in illustration, but not in limitation and referring to the drawings:

General features of invention

The present invention is concerned with eliminating difficulties encountered in conventional gearing, as will be explained more in detail later. The present invention deals particularly with gearing of a character in which inner and outer concentric gears are brought into mating relationship in a plurality of spaced areas, with interspersed areas in which they are not in mating relationship, and the areas of mating relationship are propagated forward in a wave which for the purposes of the present invention is described as a strain wave, since it represents a wave deflection in one of the gearing elements.

This strain wave is actually superimposed on the circumference of one or both of the gears, and travels with respect to it at a rate which is determined by the rate of application of load or rotatory force to the mechanism.

It should be appreciated that in the mechanism of the present invention, unlike all ordinary gearing, two cooperating gears move into and out of tooth engagement by radial motion of the teeth of one gear with respect to the other, without in the least necessitating any change in the gear axis. It will be evident, therefore, that this action presupposes a motion of parts of one of the gears with respect to other parts which can be accomplished in any suitable manner, but preferably will be achieved by deflecting an elastic material, which may be for example an elastomer such as rubber, synthetic rubber, nylon, or other plastic, or a metal such as steel, bronze, or other gear material, moving within the elastic limit, and thereby substantially free from plastic deformation.

Principles of operation

Strain wave gearing is a novel system for transmitting motion and power, in which the gear tooth engagement is induced at a plurality of points by the deflection of a thin ring gear or the like. The tooth engagement at a plurality of points around the circumference is propagated along the periphery of the thin ring gear as the crest of the induced deflection wave is made to move around this periphery. As the deflection moves around the gear, each tooth moves radially in and out of engagement as it progresses from one tooth to the next, tracing during this motion a curve which is generally of the character of a sinusoidal wave, giving rise to the term "strain wave gearing."

In the simplest form as shown for example in Figures 1 to 10 inclusive, the motion transmitting device consists of a ring gear 70, a strain gear 71, and a strain inducer 72. The ring gear has internal teeth 73 in the illustration shown, which are preferably of axially extending character. In this form the strain gear 71 has external teeth 74 which also preferably extend axially and at the same diametral pitch as the teeth on the ring gear but have a slightly smaller pitch diameter. This difference in pitch diameter is caused by the fact that the number of teeth in this case on the strain gear is less than the number of teeth on the ring gear. The difference in the number of teeth between the two gears, or the tooth differential, should in the present invention be a multiple of the number of places at which the strain gear is deflected to cause tooth engagement with the ring gear. This differential would desirably be a multiple of two, using a strain inducer having an elliptical contour with two lobes 75, as shown in Figures 1 and 2. As already explained, the strain gear 71 is made of a material which is elastic under the conditions of operation, and in the case of a steel strain gear, is made of relatively thin cross section so that it can be deflected easily in a radial direction.

The form of strain inducer for transmitting motion as illustrated in Figures 1 to 10 is a very simple one having two points of strain engagement of the strain gear. The strain inducer 72 has an elliptical contour, as already explained, whose major axis A is larger than the inside diameter of the strain gear 71 by an amount approximately equal to the difference in pitch diameter of the ring gear and the strain gear. The minor axis B is smaller than the inside diameter of the strain gear by approximately the same amount. When the strain inducer is inserted into a position inside the strain gear, as shown in Figure 3, it causes the strain gear to be distorted into elliptical form, with the pitch line of the teeth at the major axis equal to the pitch diameter of the ring gear as shown at 76 in Figures 4 and 8. At the position as shown in Figure 8 the pitch circles of the two gears are coincident. At the minor axis the pitch line of the strain gear teeth is smaller than the pitch diameter of the ring gear, and if a full tooth height is used, the teeth will just clear one another as shown at 77 in Figures 4 and 6. At intermediate points 78 and 80 as shown in Figures 4, 5 and 7, the teeth will have varying degrees of engagement. This condition prevails where the tooth differential is equal to the number of lobes on the strain inducer which in this case is two.

Figure 2a shows a modified form of the invention in which the number of lobes on the strain inducer is three.

The relationship between the respective teeth can be better understood by studying the developed view of the tooth engagement in Figures 9 and 10. In the developed form it would be necessary to have the teeth of the strain gear slightly different in pitch from those of the ring gear and in the example shown the teeth on the strain gear are slightly larger. It will be understood, however, that in the circular form the pitch of the teeth of the strain gear and the ring gear is identical, and a similar relation is obtained in the developed view, since, for circular motion, the motion is measured in degrees or radians, and the internal strain gear has fewer teeth per degree or per radian than the outer ring gear.

To further emphasize the illustrations in Figures 9 and 10, the strain inducer 72' is shown as having line contact instead of contact along an inclined plane or cam surface. In Figure 9 the distance between the point where the teeth of the ring gear and the strain gear are fully meshed at the strain inducer and the point where they are fully out of mesh has been designated as S. This is one-half the angular distance between the lobes on the strain inducer, or, for a two lobe system, 90°, the angular distance between the positions of Figures 8 and 6.

As the strain inducer 72' is moved to the right in the direction of the arrow in Figure 9 toward the position shown in Figure 10, the teeth of the strain gear gradually move into engagement ahead of the strain inducer and out of engagement behind the strain inducer. At the strain inducer they are always fully meshed. When the strain inducer has moved to the position shown in Figure 10, a distance of one-half S or 45°, the strain gear has moved to the left in relation to the ring gear a distance of one-fourth tooth. For a full 360° motion or one revolution, the strain gear will move $$\frac{360}{45} \times 1/4 = 2 \text{ teeth}$$

One complete revolution of the strain wave around the periphery of the strain gear will always produce a tooth movement which is equal to the difference in the number of teeth between ring gear and the strain gear. In this analysis it has been assumed that wave shape is a linear function of revolution.

Figures 11 and 12 illustrate the relative motions with respect to the elements shown. In each of these figures it is assumed that the ring gear 70 has 200 teeth and the strain gear 71 has 198 teeth. This simple example is used, notwithstanding that in the embodiment of the present application the difference in the number of teeth will be a multiple of the number of lobes on the strain inducer, so that if the number of lobes is two the difference in the number of teeth will be four, etc. An elliptical strain inducer 72 having two lobes is used as a driver. In the form of Figure 11, the ring gear 70 is the driven gear and the strain gear is stationary. From the motion shown in Figure 10, it will be evident that the strain gear always moves in the opposite direction to the movement of the strain inducer. Hence, with the strain gear stationary, the ring gear will move in the same direction as the strain inducer. Stated generally, the principle is that the gear that has the largest number of teeth per degree or per inch moves in the same direction as the strain inducer where the strain inducer is the driving element.

It will be seen from an analysis of Figures 9 and 10 that the tooth movement is equal to the difference in the number of teeth between the ring gear and the strain gear, in this case two teeth per revolution of the strain inducer. Since there are 200 teeth in the ring gear and it only moves two teeth per revolution of the strain inducer, it would require 100 revolutions of the strain inducer to produce one revolution of the ring gear, therefore, the gear ratio of input to output is 100 to 1.

If now we apply a similar analysis to Figure 12 it will be evident that here the strain gear 71 moves two teeth per revolution of the strain inducer 72. However, in the case of Figure 12, there are two important differences, first, the direction is opposite to the motion of the strain inducer, and secondly, it moves the same distance, that is, two teeth, but in a smaller total number of teeth, that is, 198. Therefore, for Figure 12 the gear ratio is 198 to 2 or 99 to −1 (since it is in the opposite direction the 1 is negative).

While the simplest case has been considered thus far, the present application is concerned with the feature that the difference in the number of teeth between the strain gear and the ring gear is a multiple of the number of places at which the strain gear is deflected to make tooth engagement with the ring gear. Thus if there are two such places, the difference in number of teeth will be 4, 6, etc. and if there are three such places the difference in number of teeth will be 6, 9, etc.

In the analysis so far, it has been assumed that the strain inducer is the driving element. Since, however, strain wave gearing can be made to have a relatively high mechanical efficiency, any of the three elements can be utilized as the driving element with either of the remaining elements as the driven element. For example, in Figure 11, the strain gear may be stationary, with the ring gear the driver, and the strain inducer driven. When used in this manner, the driven strain inducer makes 100 revolutions for every revolution of the driving ring gear.

While we have in this initial simplified analysis assumed a condition in which the strain inducer is internal and the strain gear is located outside the strain inducer and inside the ring gear, it will be evident as later explained that these features can be reversed, for example placing the strain inducer on the outside, and the strain gear inside it, and the ring gear on the very inside.

The gear ratio is the function of the difference in the diameter of the two gears and is entirely independent of the tooth size since the number of teeth in each gear is directly related to their pitch diameters. The teeth, therefore, could be made of infinitesimal size, or in fact there may be no teeth at all, with merely frictional contact engagement, and the gear ratio will not be affected in the least by any such change in construction. The number of complete strain wave revolutions around the strain gear for one revolution of the output element is equal to the difference in pitch diameter of the two gears divided into the pitch diameter of the driven element. For example, let us assume that the numbers as indicated in Figure 11 constitute one hundredths of an inch instead of teeth. Then the ring gear would have a circumference of 2.00 inches and the strain gear would have a circumference of 1.98 inches. The number of turns that the driver or strain inducer would turn to produce one revolution of the ring gear would then be:

$$\frac{2.00}{2.00-1.98} = \frac{2.00}{0.02} = \frac{100}{1}$$

In my patent above referred to the number of lobes on the strain inducer is designated as $n$, and it is this number which is multiplied by a factor to obtain the difference between the number of teeth of the cooperating gears.

Throughout this description of strain wave gearing it has been assumed than $n$ was equal to the difference in the number of teeth in the two gears and the tooth relations were developed accordingly. While this relationship is not mandatory, many of the advantages of strain wave gearing are sacrificed by having the tooth difference a multiple of $n$ without deriving any compensating advantages in most cases.

By reference to Formulae 4 to 9 in my patent aforesaid, it will be evident that the number substituted for $n$ may be either three or two in the usual case.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a device for transmitting motion, a first gear, a second gear of different diameter from the first, having teeth of the same size as the first gear, concentric therewith and having a deflectable wall, the first and second gears having cooperating gear teeth of the same diametral pitch but of different pitch diameter, the strain inducing element having lobes operative to deflect a second gear, and maintaining the second gear deflected into mating relation of its teeth with the teeth of the first gear at a plurality of circumferentially spaced positions interspaced by nonmating positions, the number of teeth on the first and second gear differing by a difference which is a multiple of the number of lobes on the strain-inducing element, and means for moving the operative relationship of the strain-inducing element relative to the periphery of the second gear and thereby propagating a strain wave around the periphery of the second gear and causing relative rotation of the second gear with respect to the first gear.

2. A device of claim 1, having two generally diametrally opposed lobes on the strain-inducing element.

3. A device of claim 1, having three generally equally circumferentially spaced lobes on the strain-inducing element.

No references cited.